US011440541B2

United States Patent
Han et al.

(10) Patent No.: US 11,440,541 B2
(45) Date of Patent: Sep. 13, 2022

(54) APPARATUS AND METHOD FOR PREDICTING CONCURRENT LANE CHANGE AND VEHICLE INCLUDING THE SAME

(71) Applicants: HYUNDAI MOTOR COMPANY, Seoul (KR); KIA Motors Corporation, Seoul (KR); AJOU UNIVERSITY INDUSTRY-ACADEMIC COOPERATION FOUNDATION, Suwon-si (KR)

(72) Inventors: Seul Ki Han, Seoul (KR); Su Min Jo, Hwaseong-si (KR); Hoon Lee, Gunpo-si (KR); Sang Won Lee, Yongin-si (KR); Sung Woo Lee, Ulsan (KR); Jong Gwan Lee, Suwon-si (KR); Bong Sob Song, Seongnam-si (KR)

(73) Assignees: Hyundai Motor Company, Seoul (KR); Kia Motors Corporation, Seoul (KR); Ajou University Industry-Academic Cooperation Foundation, Gyeonggi-do (KR)

( * ) Notice: Subject to any disclaimer, the term of this patent is extended or adjusted under 35 U.S.C. 154(b) by 434 days.

(21) Appl. No.: 16/206,336

(22) Filed: Nov. 30, 2018

(65) Prior Publication Data
US 2020/0114910 A1 Apr. 16, 2020

(30) Foreign Application Priority Data
Oct. 10, 2018 (KR) .................. 10-2018-0120629

(51) Int. Cl.
*B60W 30/095* (2012.01)
*B60W 30/18* (2012.01)
*G08G 1/16* (2006.01)

(52) U.S. Cl.
CPC .. *B60W 30/0956* (2013.01); *B60W 30/18163* (2013.01); *G08G 1/167* (2013.01)

(58) Field of Classification Search
CPC ........ B60W 30/0956; B60W 30/18163; G08G 1/167
See application file for complete search history.

(56) References Cited

U.S. PATENT DOCUMENTS

| | | | | |
|---|---|---|---|---|
| 2004/0061596 | A1* | 4/2004 | Egami | G08G 1/165 340/425.5 |
| 2018/0201271 | A1* | 7/2018 | Ishioka | B60W 10/18 |

(Continued)

*Primary Examiner* — Thomas E Worden
(74) *Attorney, Agent, or Firm* — Fox Rothschild LLP

(57) ABSTRACT

An apparatus for predicting a concurrent lane change of multiple vehicles to prevent or minimize collision, and a vehicle using the same. The apparatus includes a subject vehicle state estimator for estimating a state of a subject vehicle based on subject vehicle information and surrounding lane state information, a surrounding vehicle state estimator for estimating a state of a surrounding vehicle based on the subject vehicle state information and surrounding vehicle information, a lane state estimator for estimating a state of a surrounding lane based on the estimated subject vehicle state information and surrounding lane information, and a lane change predictor for predicting concurrent lane change of the subject vehicle and the surrounding vehicle based on the estimated subject vehicle state information, the estimated surrounding vehicle state information and the estimated surrounding lane state information.

20 Claims, 14 Drawing Sheets

(56) References Cited

U.S. PATENT DOCUMENTS

| | | | |
|---|---|---|---|
| 2019/0071075 A1* | 3/2019 | Mimura | G08G 1/16 |
| 2019/0096258 A1* | 3/2019 | Ide | B62D 15/025 |
| 2019/0351906 A1* | 11/2019 | Oh | B60W 30/16 |
| 2019/0382018 A1* | 12/2019 | Garnault | B60W 60/00272 |

* cited by examiner

APPARATUS AND METHOD FOR PREDICTING CONCURRENT LANE CHANGE AND VEHICLE INCLUDING THE SAME

This application claims the benefit of Korean Patent Application No. 10-2018-0120629, filed on Oct. 10, 2018, which is hereby incorporated by reference as if fully set forth herein.

BACKGROUND

Field

The present disclosure relates to an apparatus for predicting a concurrent lane change of multiple vehicles.

Discussion of the Related Art

In general, vehicles have been developed into intelligent vehicles capable of not only improving fuel efficiency and performance but also providing improved safety and convenience using advanced information communication technology.

However, since the intelligent vehicle includes many additional functions such as an entertainment system, an air purifier and a convenience device, a driver operates additional operation devices in addition to operation devices for driving, thereby increasing the risk of accident due to driver carelessness.

Accordingly, recently, research into safety devices capable of preventing or avoiding vehicle collision has been conducted.

A vehicle collision avoidance system may include an adaptive cruise control system, a forward vehicle collision warning system, a lane departure warning system, etc. Such vehicle collision avoidance systems are mainly used in high-speed traveling to prevent major accidents and technologies for detecting a distant obstacle when a vehicle travels at a high speed are mainly used.

SUMMARY

Accordingly, one aspect of the present invention is directed to an apparatus and method for predicting a concurrent lane change of multiple vehicles and a vehicle including the same.

Another aspect of the present invention provides an apparatus and method for predicting a concurrent lane change of multiple vehicles, which is capable of preventing or minimizing collision and increasing safety, by accurately improving the heading angle of the concurrent lane change vehicle and accurately predicting various situations of the concurrent lane change of multiple vehicles, and a method including the same.

Additional advantages, aspects, and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

Still another aspect of the invention provides an apparatus for predicting a concurrent lane change of a subject vehicle and a surrounding vehicle includes a subject vehicle state estimator configured to estimate a state of the subject vehicle based on subject vehicle information and surrounding lane state information, a surrounding vehicle state estimator configured to estimate a state of the surrounding vehicle based on the subject vehicle state information from the subject vehicle state estimator and surrounding vehicle information, a lane state estimator configured to estimate a state of a surrounding lane based on the estimated subject vehicle state information from the subject vehicle state estimator and surrounding lane information, and a lane change predictor configured to predict concurrent lane change of the subject vehicle and the surrounding vehicle based on the estimated subject vehicle state information from the subject vehicle state estimator, the estimated surrounding vehicle state information from the surrounding vehicle state estimator and the estimated surrounding lane state information from the lane state estimator.

According to yet another aspect of the present invention, a method of predicting a concurrent lane change of a subject vehicle and a surrounding vehicle in a concurrent lane change prediction apparatus including a subject vehicle estimator, a surrounding vehicle state estimator, a lane state estimator and a lane change predictor includes the subject vehicle state estimator estimating a state of the subject vehicle based on subject vehicle information and surrounding lane state information, the surrounding vehicle state estimator estimating a state of the surrounding vehicle based on the estimated subject vehicle state information and surrounding vehicle information, the lane state estimator estimating a state of a surrounding lane based on the estimated subject vehicle state information and surrounding lane information, and the lane change predictor predicting concurrent lane change of the subject vehicle and the surrounding vehicle based on the estimated subject vehicle state information, the estimated surrounding vehicle state information and the estimated surrounding lane state information.

According to a further aspect of the present invention, a computer-readable recording medium having recorded thereon a program for executing the method of predicting the concurrent lane change of the subject vehicle and the surrounding vehicle in the concurrent lane change prediction apparatus may perform a process provided by the method of predicting the concurrent lane change of the multiple vehicles.

According to another aspect of the present invention, a vehicle includes a sensing device configured to sense a subject vehicle, a surrounding vehicle and a surrounding lane, and a concurrent lane change prediction apparatus configured to predict a concurrent lane change of a subject vehicle and a surrounding vehicle based on subject vehicle information, surrounding vehicle information and surrounding lane information received from the sensing device, wherein the concurrent lane change prediction apparatus includes a subject vehicle state estimator configured to estimate a state of the subject vehicle based on the subject vehicle information and surrounding lane state information, a surrounding vehicle state estimator configured to estimate a state of the surrounding vehicle based on the estimated subject vehicle state information from the subject vehicle state estimator and the surrounding vehicle information, a lane state estimator configured to estimate a state of a surrounding lane based on the estimated subject vehicle state information from the subject vehicle state estimator and the surrounding lane information, and a lane change predictor configured to predict concurrent lane change of the subject vehicle and the surrounding vehicle based on the estimated subject vehicle state information from the subject vehicle state estimator, the estimated surrounding vehicle state information from the surrounding vehicle state estimator and the estimated lane state information from the lane state estimator.

The aspects of the present invention are only a part of embodiments of the present invention, and various embodiments based on technical features of the present invention may be devised and understood by a person with ordinary skill in the art based on the detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Figure 1:
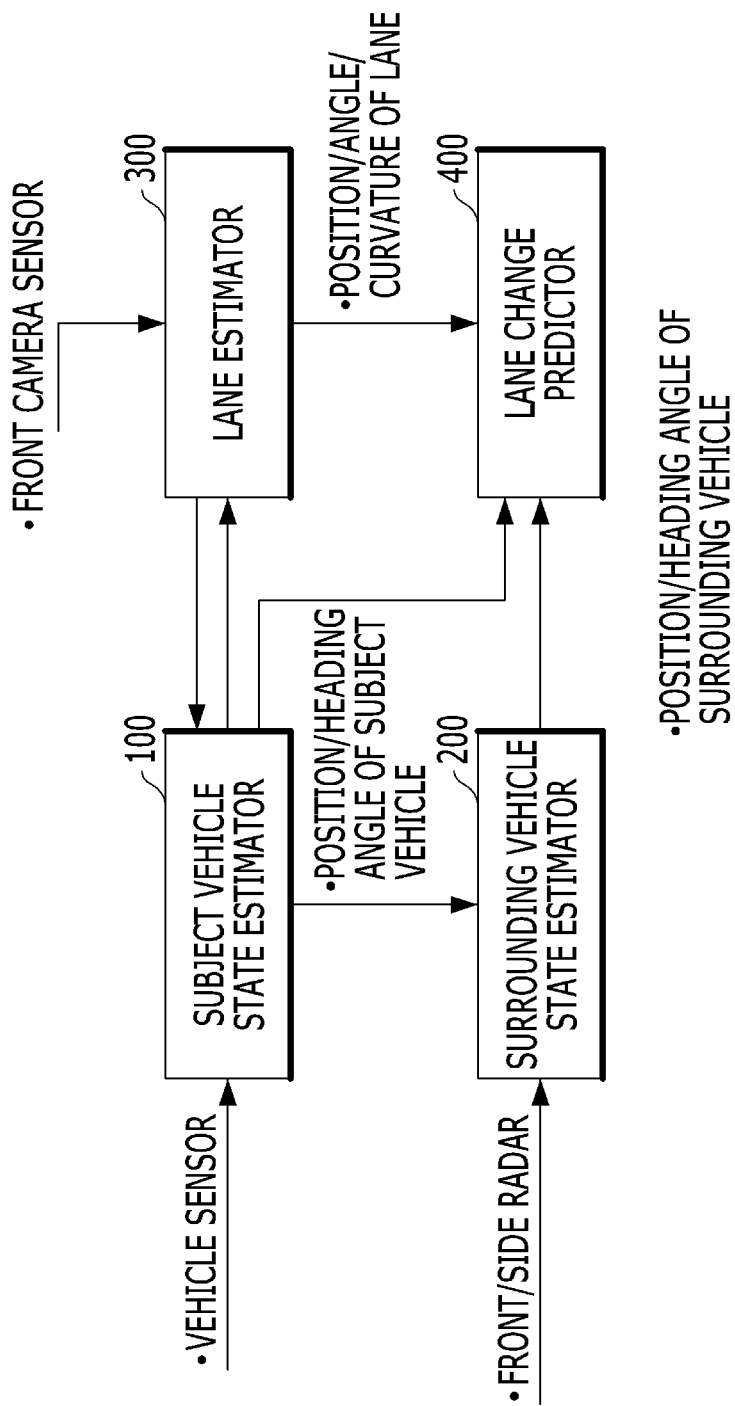
FIG. 1 is a block diagram illustrating an apparatus for predicting a concurrent lane change of multiple vehicles according to embodiments of the present invention.

Hereinafter, embodiments of the present invention will be described in detail with reference to the accompanying drawings so as to be easily implemented by those skilled in the art. However, the present invention may be variously implemented and is not limited to the embodiments described herein. In the drawings, in order to clearly describe embodiments of the present invention, portions which are not related to the description of the present invention will be omitted and similar portions are denoted by similar reference numerals throughout the specification.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software or a combination thereof.

Throughout the specification, when a certain portion "includes" a certain component, this indicates that the other components are not excluded, but may be further included unless specially described. The same reference numbers will be used throughout the drawings to refer to the same or like parts.

Hereinafter, an apparatus and method for predicting a concurrent lane change of multiple vehicles, and a vehicle including the same, which are applicable to the embodiments of the present invention, will be described in detail with reference to FIGS. 1 to 8b.

Most actual traffic accidents occur among vehicles which perform concurrent lane change. Typical collision avoidance systems cannot accurately recognize another vehicle performing concurrent lane change to prevent or minimize collision.

For example, when a subject vehicle or an ego vehicle performs lane change and, at the same time, a surrounding vehicle attempts to perform lane change to a corresponding lane, the heading angle of the surrounding vehicle measured by the sensor of the subject vehicle may become inaccurate.

If the heading angle of the vehicle performing lane change becomes inaccurate, it is difficult to determine the intention of the vehicle, thereby increasing the risk of collision.

Embodiments provide an apparatus for predicting a concurrent lane change of multiple vehicles, which is capable of preventing or avoiding collision and increasing safety, by accurately determining the heading angle of the concurrent lane change of the vehicles and accurately predicting various situations of the concurrent lane change of the vehicles.

FIG. 1 is a block diagram illustrating an apparatus for predicting a concurrent lane change of multiple vehicles according to embodiments of the present invention.

As shown in FIG. 1, the apparatus for predicting the concurrent lane change of multiple vehicles of embodiments of the present invention may include a subject vehicle state estimator 100, a surrounding vehicle state estimator 200, a lane state estimator 300 and a lane change predictor 400.

When subject vehicle information and estimated surrounding lane state information are received, the subject vehicle state estimator 100 may estimate the state of the subject vehicle based on the received subject vehicle information and the estimated surrounding lane state information.

When the subject vehicle information is received, the subject vehicle state estimator 100 may receive subject vehicle information from one or more internal sensors of the subject or ego vehicle.

In addition, when the estimated surrounding lane state information is received, the subject vehicle state estimator 100 may receive the estimated surrounding lane state information from the lane state estimator 300.

The estimated surrounding lane state information may include the position, angle and curvature of a surrounding lane, without being limited thereto.

In some cases, when the subject vehicle information and the estimated surrounding lane state information are received, the subject vehicle state estimator 100 may request the surrounding lane state information from the lane state estimator upon receiving the subject vehicle information to receive the estimated surrounding lane state information from the lane state estimator 300.

In other cases, when the subject vehicle information and the estimated surrounding lane state information are received, the subject vehicle state estimator 100 may request the subject vehicle information from the internal sensor of the subject vehicle upon receiving a concurrent lane change prediction request of a user to receive the subject vehicle information from the internal sensor of the subject vehicle, and, at the same time, request the surrounding lane state information from the lane state estimator 300 to receive the estimated surrounding lane state information from the lane state estimator 300.

In other cases, when the subject vehicle information and the estimated surrounding lane state information are received, the subject vehicle state estimator 100 may request the subject vehicle information from the internal sensor of the subject vehicle upon receiving a concurrent lane change prediction request of a user to receive the subject vehicle information from the internal sensor of the subject vehicle, and request the surrounding lane state information from the lane state estimator upon receiving the subject vehicle information from the internal sensor of the subject vehicle to receive the estimated surrounding lane state information from the lane state estimator.

In addition, when the state of the subject vehicle or ego vehicle is estimated, the subject vehicle state estimator 100 may estimate the state of the subject vehicle including the position and heading of the subject vehicle.

In addition, when the state of the subject vehicle is estimated, the subject vehicle state estimator 100 may transmit the estimated subject vehicle state information to the surrounding vehicle state estimator 200, the lane state estimator 300 and the lane change predictor 400.

When the surrounding vehicle information is received, the surrounding vehicle state estimator 200 may estimate the state of the surrounding vehicle through convergence of the received surrounding vehicle information. In embodiments, the ego vehicle and the surrounding vehicle drive two different lanes, and are going to make lane change to the same target lane that is interposed between the two different lanes.

When the surrounding vehicle information is received, the surrounding vehicle state estimator 200 may receive the surrounding vehicle information from a front radar and a side radar of the subject vehicle.

For example, the surrounding vehicle information may include a side radar track, a front radar track and a free space, without being limited thereto.

When the state of the surrounding vehicle is estimated, the surrounding vehicle state estimator 200 may generate a convergence track based on the received surrounding vehicle information, predict the convergence track based the generated convergence track, and track the predicted convergence track, thereby estimating the state of the surrounding vehicle.

When the convergence track is generated, the surrounding vehicle state estimator 200 may check whether a side radar track included in the received surrounding vehicle information is present in a predetermined region of interest (ROI) of convergence, check whether a convergence track associated with the side radar track is present when the side radar track is present in the ROI of convergence, and generate a new convergence track corresponding to the side radar track when the convergence track associated with the side radar track is not present in the ROI of convergence.

Subsequently, when checking whether the side radar track is present in the predetermined ROI of convergence, the surrounding vehicle state estimator 200 may remove the convergence track corresponding to the side radar track if the side radar track is not present in the ROI of convergence.

When the convergence track corresponding to the side radar track is removed, the surrounding vehicle state estimator 200 may remove the convergence track corresponding to the side radar track if a measurement value of the convergence track corresponding to the side radar track is not present.

For example, when the convergence track is predicted, the surrounding vehicle state estimator 200 may predict the convergence track of a previous time as a convergence track of a current time using an equation of motion.

In addition, for example, when the convergence track is tracked, the surrounding vehicle state estimator 200 may track the convergence track through convergence of the front radar track and the free space of the surrounding vehicle information using a particle filter.

When the convergence track is tracked, the surrounding vehicle state estimator 200 may calculate a degree of importance with respect to the predicted convergence track using the front radar track and the free space, calculate an expected value and a covariance of the convergence track using the calculated degree of importance and the particles of the convergence track, and resample the calculated result to track the convergence track.

At this time, when the calculated result is resampled, the surrounding vehicle state estimator 200 may remove particles having a lower degree of importance than a predetermined reference value from the calculated result and resample the calculated result.

In addition, when the degree of importance is calculated with respect to the predicted convergence track using the front radar track and the free space, the surrounding vehicle state estimator 200 may detect the front radar track and the free space associated with the predicted convergence track and calculate the degree of importance using the detected front radar track and the free space.

When the front radar track and the free space associated with the predicted convergence track are detected, the surrounding vehicle state estimator 200 may check association between the predicted convergence track and the front radar track through gating of the front radar track, check association between the predicted convergence track and the free space through gating of the free space, and detect the front radar track and the free space associated with the predicted convergence track based on the checked association.

In addition, when the state of the surrounding vehicle is estimated, the surrounding vehicle state estimator 200 may estimate the state of the surrounding vehicle based on the position and heading angle of the subject vehicle included in the estimated subject vehicle state information.

In addition, when the state of the surrounding vehicle is estimated, the surrounding vehicle state estimator 200 may transmit the estimated surrounding vehicle state information to the lane change predictor 400.

The estimated surrounding vehicle state information may include the position and heading angle of the surrounding vehicle, without being limited thereto.

Next, when the surrounding lane information is received, the lane state estimator 300 may estimate the state of the surrounding lane based on the surrounding lane information and the estimated subject vehicle state information.

Here, when the surrounding lane information is received, the lane state estimator 300 may receive the surrounding lane information from a front camera sensor of the subject vehicle.

In addition, when the state of the surrounding lane is estimated, the lane state estimator 300 may estimate the state of the surrounding lane based on the position and heading angle of the subject vehicle included in the estimated subject vehicle state information.

Subsequently, when the state of the surrounding lane is estimated, the lane state estimator 300 may transmit the estimated surrounding lane state information to the subject vehicle state estimator and the lane change predictor 400.

The estimated surrounding lane state information may include the position, angle and curvature of the surrounding lane, without being limited thereto.

Next, the lane change predictor may predict concurrent lane change of the subject vehicle and the surrounding vehicle based on the estimated subject vehicle state information from the subject vehicle state estimator 100, the estimated surrounding vehicle state information from the surrounding vehicle state estimator 200 and the estimated lane state information from the lane state estimator 300.

When the concurrent lane change of the subject vehicle and the surrounding vehicle is predicted, the lane change predictor 400 may recognize a situation in which the rear wheel of a target vehicle and the front wheel of the subject vehicle are located on the same line based on the estimated subject vehicle state, the estimated surrounding vehicle state and the estimated lane state, and predict the concurrent lane change of the subject vehicle and the target vehicle according to the recognized situation.

In some cases, when the concurrent lane change of the subject vehicle and the surrounding vehicle is predicted, the lane change predictor 400 may recognize a situation wherein the front wheel of a target vehicle and the front wheel of the subject vehicle are located on the same line based on the estimated subject vehicle state, the estimated surrounding vehicle state and the estimated lane state, and predict the concurrent lane change of the subject vehicle and the target vehicle according to the recognized situation.

In the other cases, when the concurrent lane change of the subject vehicle and the surrounding vehicle is predicted, the lane change predictor 400 may recognize a situation wherein the front wheel of a target vehicle and the rear wheel of the subject vehicle are located on the same line based on the estimated subject vehicle state, the estimated surrounding vehicle state and the estimated lane state, and predict the concurrent lane change of the subject vehicle and the target vehicle according to the recognized situation.

In embodiments of the present invention, it is possible to prevent or avoid collision in advance and to improve safety, by improving accuracy of the heading angle of the concurrent lane change of multiple vehicles and accurately estimating various situations of the concurrent lane change of the vehicles.

In addition, in embodiments of the present invention, the vehicle can safely move in correspondence with the concurrent lane change situation, by improving accuracy of the heading angle of the vehicle.

In addition, in embodiments of the present invention, the vehicle can safely move in correspondence with the concurrent lane change situation, by accurately estimating the longitudinal/lateral error, heading angle error and shape of the vehicle.

In addition, in embodiments of the present invention, it is possible to improve estimation performance of the position and heading angle of the surrounding vehicle using the sensor model of the front radar and the side radar.

In embodiments of the present invention, if the design of the sensor model is modified or added using the particle filter, it is possible to freely replace or add the sensor.

Embodiments of the present invention can enable fast situation recognition through accurate heading angle estimation of another vehicle in the concurrent lane change situation.

Embodiments of the present invention can enable precise collision avoidance by estimating the state of the subject vehicle and the state of the surrounding environment (lane) in the concurrent lane change situation.

Figure 2A:
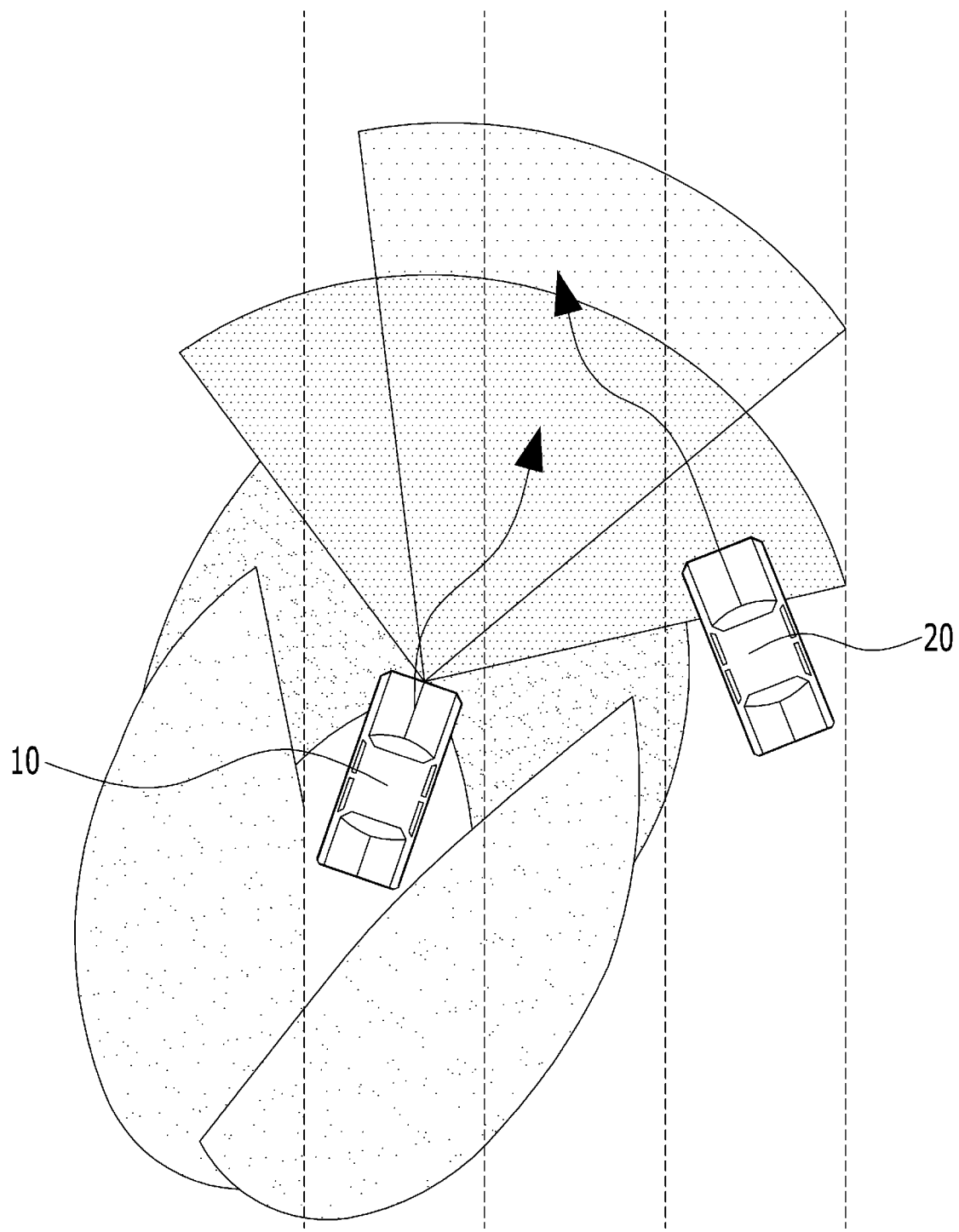
FIGS. 2A, 2B and 2C are views illustrating various situations of the concurrent lane change of multiple vehicles.
Figure 2B:
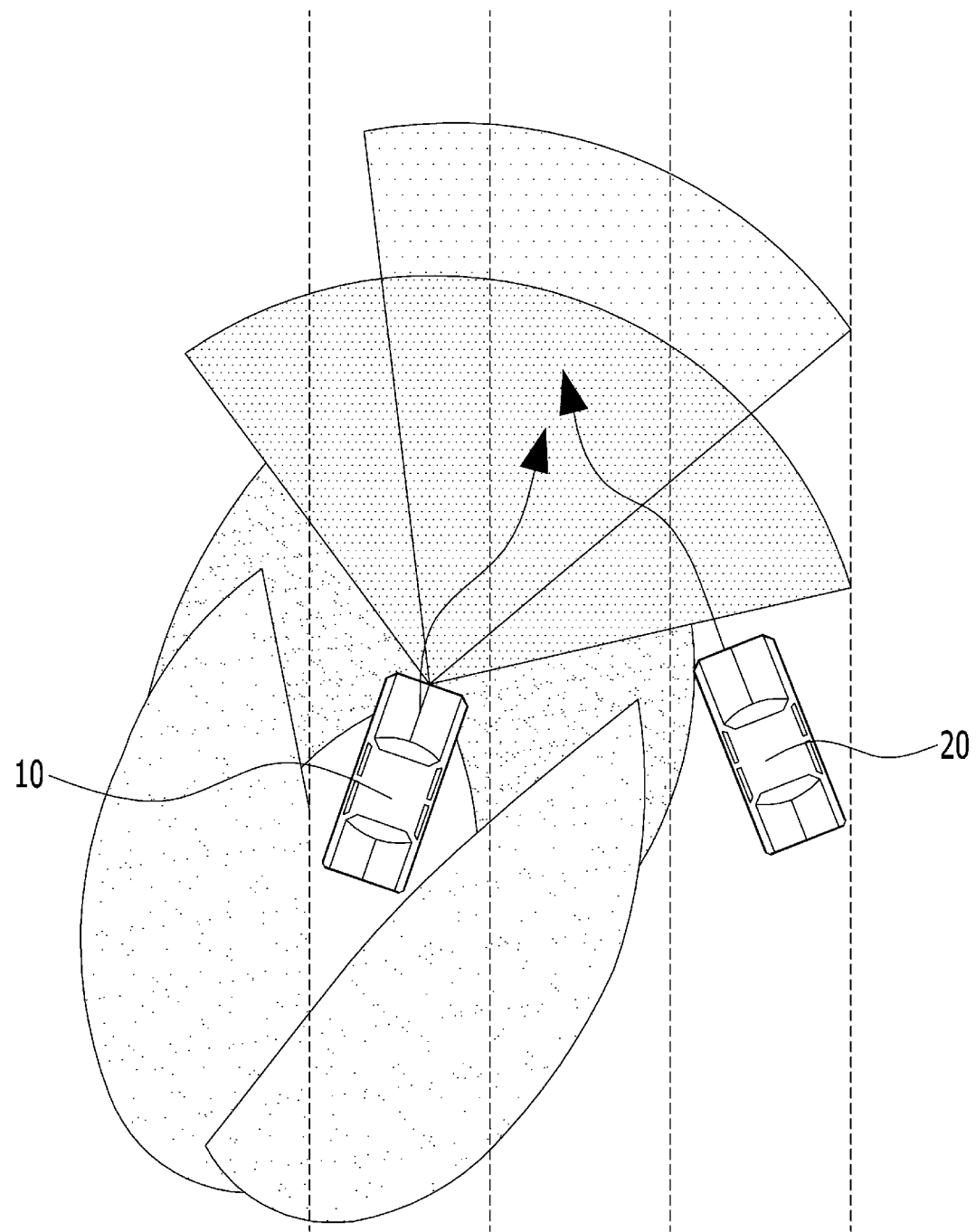
Figure 2C:
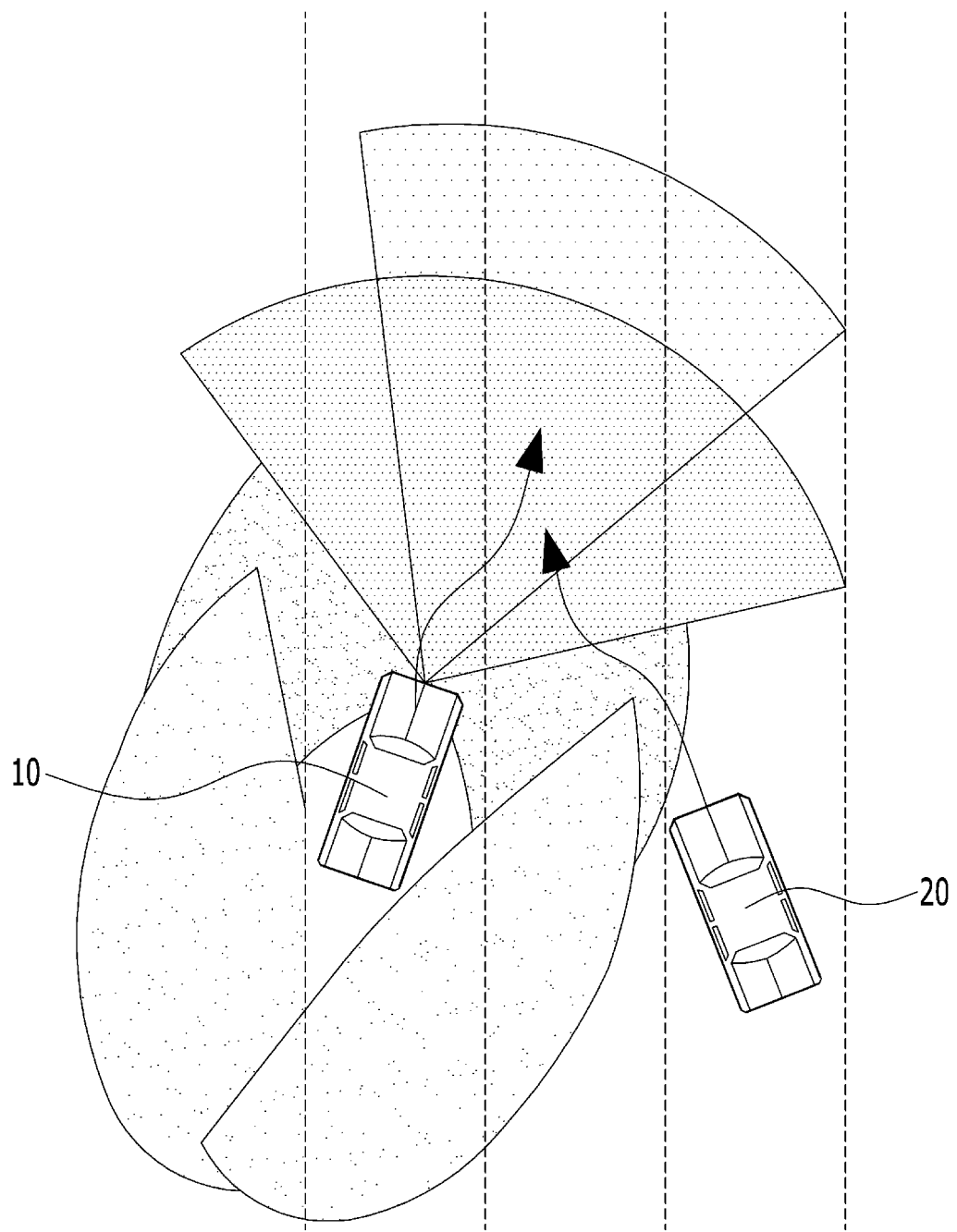
Figure 3A:
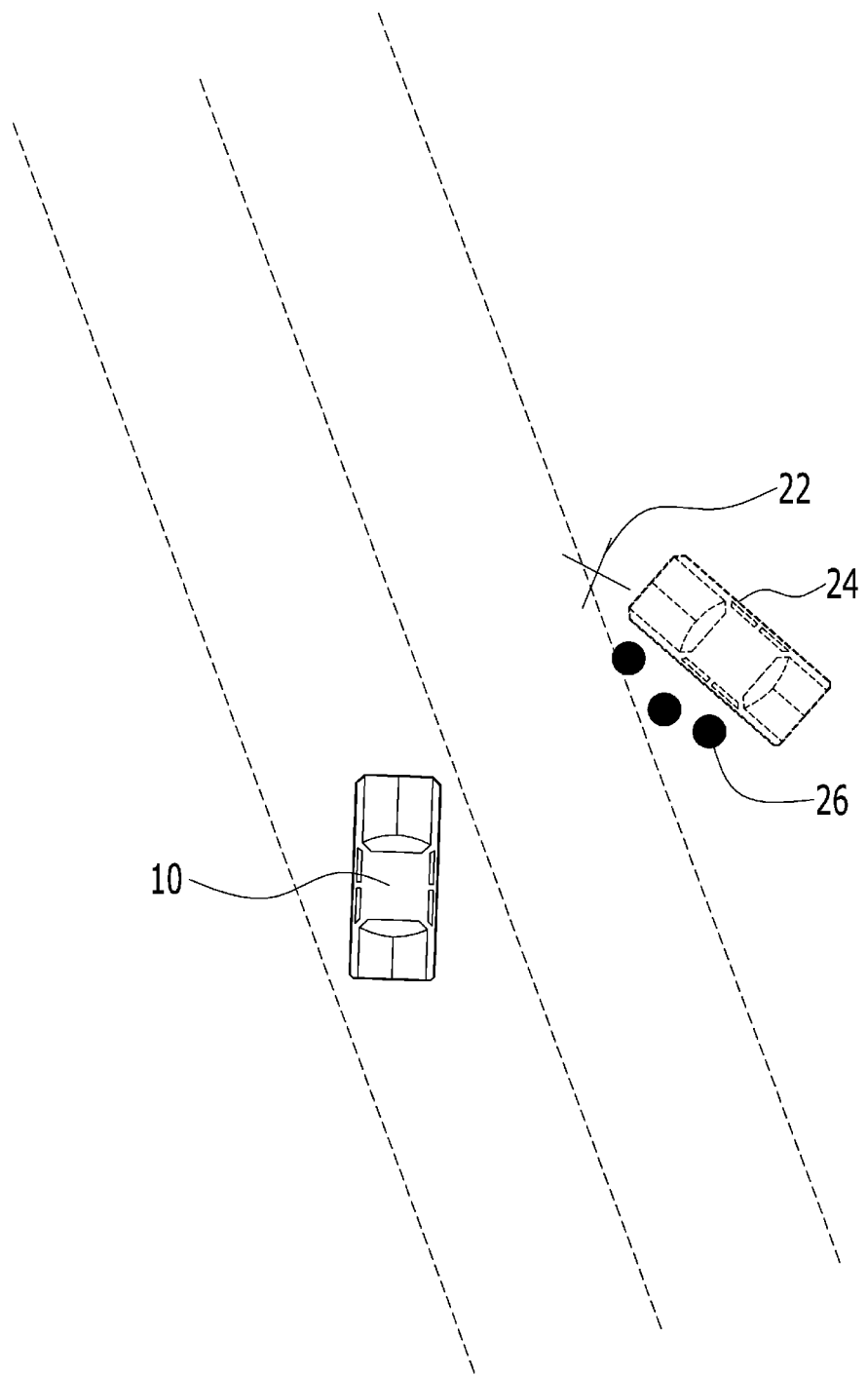
FIGS. 3A, 3B and 3C are views illustrating sensor output results of a subject vehicle according to a concurrent lane change situation.
Figure 3B:
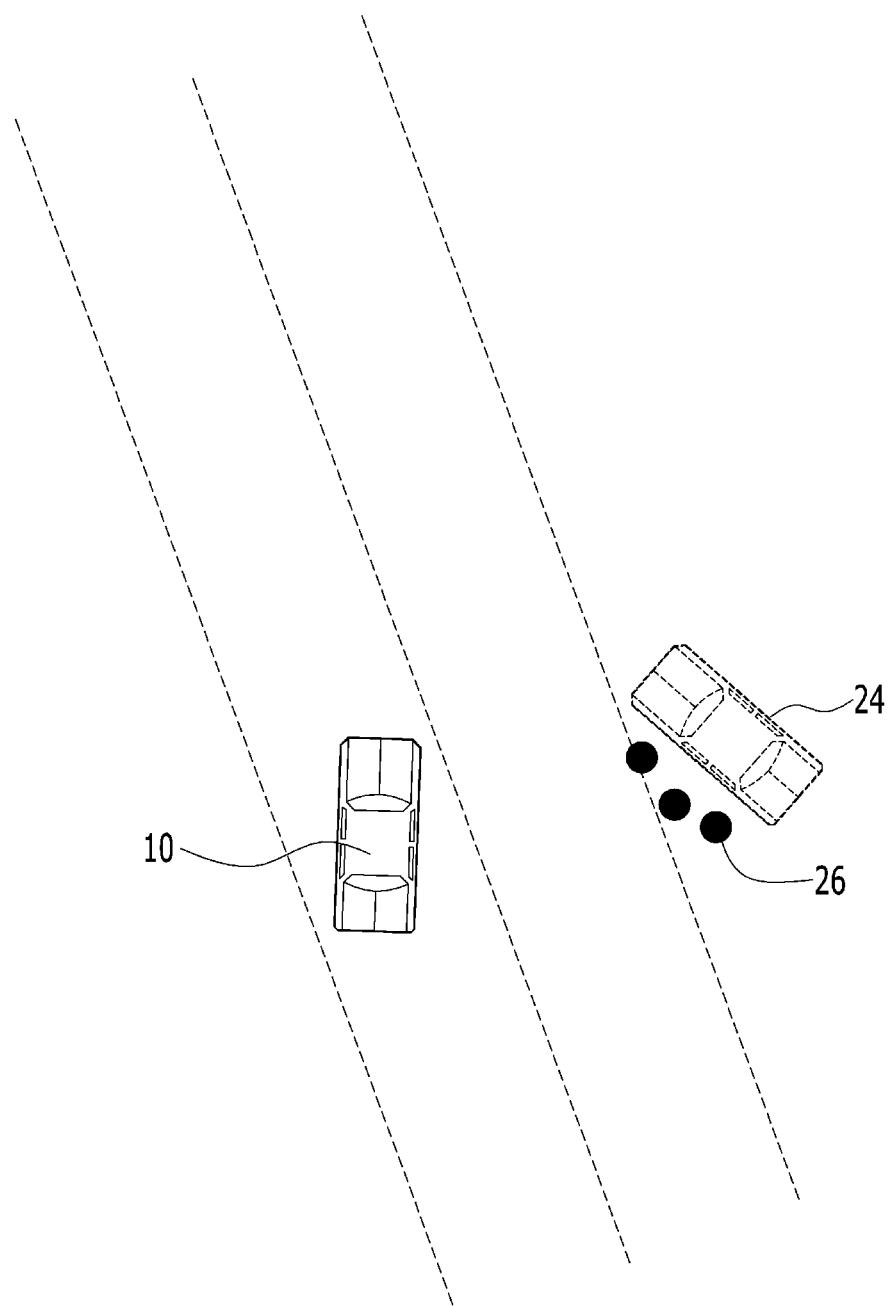
Figure 3C:
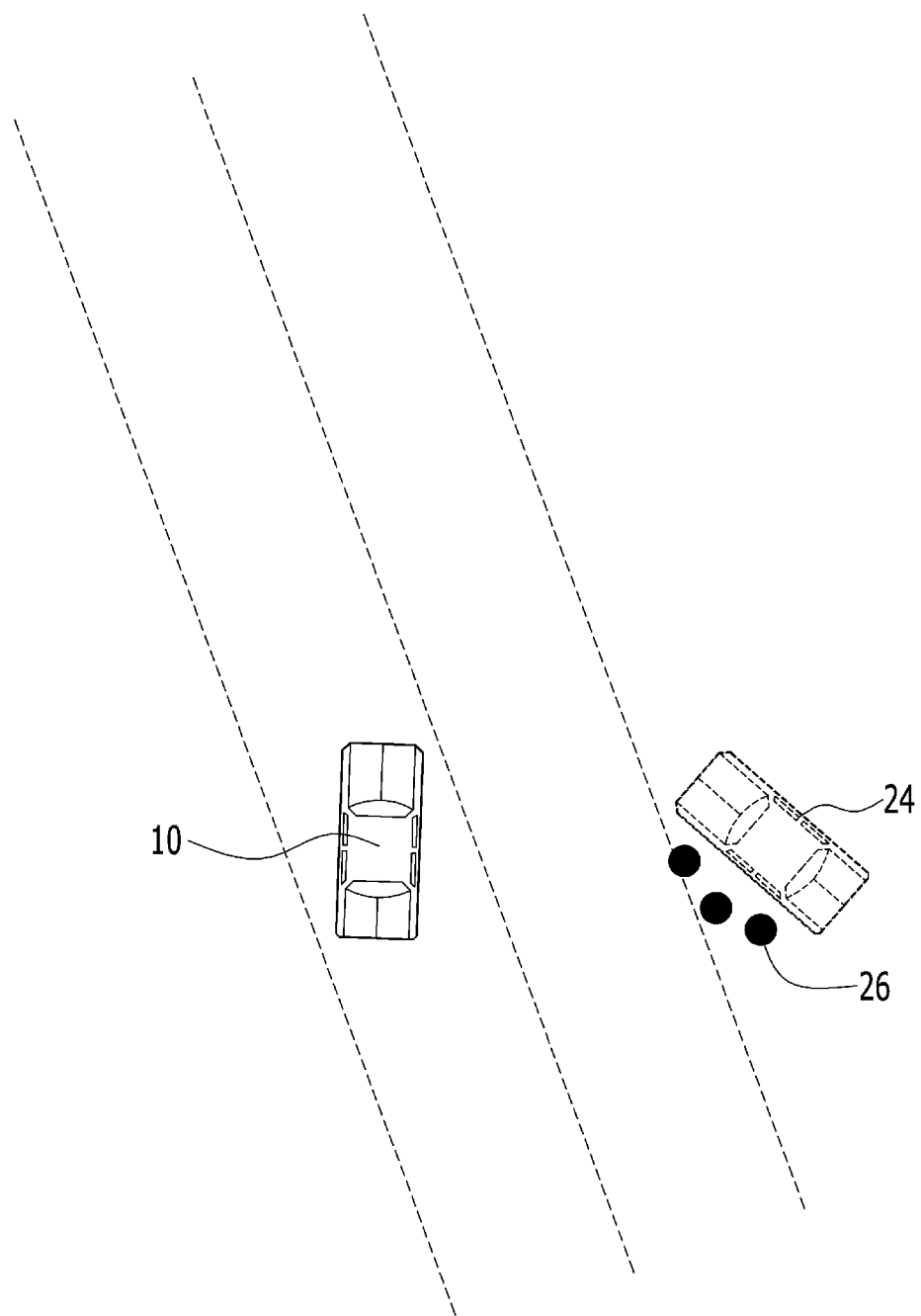

FIGS. 2A to 2C are views illustrating various situations of the concurrent lane change of multiple vehicles, and FIGS. 3A to 3C are views illustrating sensor output results of a subject vehicle according to a concurrent lane change situation;

FIGS. 2A to 2C show a concurrent lane change scenario. FIG. 2A shows a scenario in which a lane is changed in a situation in which the rear wheel of a target vehicle 20 and the front wheel of the subject vehicle 10 are located on the same line. In embodiments of the present invention, the concurrent lane change of the subject vehicle 10 and the target vehicle 20 may be predicted based on information received from the front and side radars of the subject vehicle.

FIG. 2B shows a scenario in which a lane is changed in a situation in which the front wheel of a target vehicle 20 and the front wheel of the subject vehicle 10 are located on the same line. In embodiments of the present invention, the concurrent lane change of the subject vehicle 10 and the target vehicle 20 may be predicted based on information received from the side radar of the subject vehicle.

FIG. 2C shows a scenario in which a lane is changed in a situation in which the front wheel of a target wheel 20 and the rear wheel of the subject vehicle 10 are located on the same line. In embodiments of the present invention, the concurrent lane change of the subject vehicle 10 and the target vehicle 20 may be predicted based on information received from the side radar of the subject vehicle.

FIGS. 3A to 3C show the results output from the front radar, the side radar and the front camera sensor in the scenarios of FIGS. 2A to 2C and show a front radar track 22, a side radar track 24 and a free space 26 for the target vehicle 20.

In embodiments of the present invention, the heading angle of the subject vehicle 10 for lane change prediction may be estimated using the internal sensor of the vehicle, the position and heading angle of the target vehicle 20 for lane change prediction may be estimated using the front radar and the side radar and, in order to for determine a lane change time, the lane state may be estimated using the front camera sensor and the internal sensor of the vehicle.

FIGS. 4 to 7 are views illustrating a process of estimating the state of the surrounding vehicle in the surrounding vehicle state estimator of FIG. 1.

As shown in FIGS. 4 to 7, when the surrounding vehicle information is received, the surrounding vehicle state estimator of embodiments of the present invention may estimate the state of the surrounding vehicle through convergence of the received surrounding vehicle information.

When the surrounding vehicle information is received, the surrounding vehicle state estimator may receive the surrounding vehicle information from the front radar and the side radar of the subject vehicle.

For example, the surrounding vehicle information may include the side radar track, the front radar track and the free space, without being limited thereto.

In addition, when the state of the surrounding vehicle is estimated, the surrounding vehicle state estimator may generate a convergence track based on the received surrounding vehicle information, predict the convergence track based on the generated convergence track, track the predicted convergence track, and estimate the state of the surrounding vehicle.

When the convergence track is generated, the surrounding vehicle state estimator may check whether the side radar track included in the received surrounding vehicle information is present in a predetermined region of interest (ROI) of convergence, check whether the convergence track associated with the side radar track is present when the side radar track is present in the ROI of convergence, and generate a new convergence track corresponding to the side radar track when the convergence track associated with the side radar track is not present in the ROI of convergence.

Subsequently, upon checking whether the side radar track is present in the predetermined ROI of convergence, the surrounding vehicle state estimator may remove the convergence track corresponding to the side radar track when the side radar track is not present in the ROI of convergence.

When the convergence track corresponding to the side radar track is removed, the surrounding vehicle state estimator may remove the convergence track corresponding to the side radar track when the measurement value of the convergence track corresponding to the side radar track is not present.

For example, when the convergence track is estimated, the surrounding vehicle state estimator may predict the convergence track of a previous time as the convergence track of a current time using an equation of motion.

Figure 4:
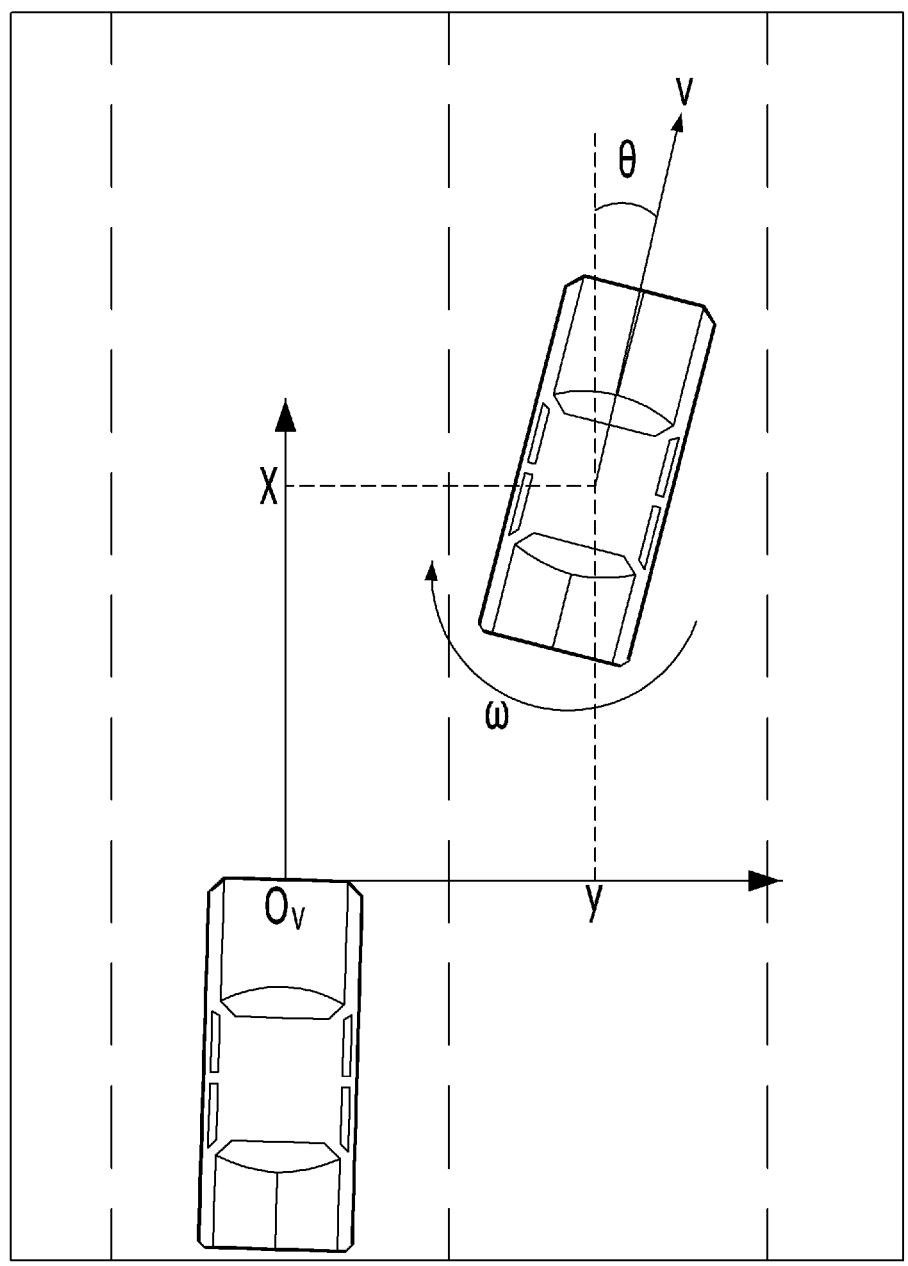
FIGS. 4, 5, 6A, 6B and 7 are views illustrating a process of estimating the state of a surrounding vehicle in a surrounding vehicle state estimator of FIG. 1.

As shown in FIG. 4, when the convergence track is estimated, the surrounding vehicle state estimator may predict motion of the vehicle using a constant turn-rate and velocity (CTRV) model.

Here, $P(X_k/X_{k-1})$ means the probability of the state of an object at a time k when the state of the object at a time k−1 is known and may be calculated by the following equation.

$$P(x_k \mid x_{k-1})$$

$$\begin{bmatrix} x_k \\ y_k \\ \theta_k \\ v_k \\ \omega_k \end{bmatrix} = \begin{bmatrix} x_{k-1} + v_{k-1}/\omega_{k-1}(\cos(\theta_{k-1}) - \cos(\theta_{k-1} + T\omega_{k-1})) \\ y_{k-1} + v_{k-1}/\omega_{k-1}(\sin(\theta_{k-1} + T\omega_{k-1}) - \sin(\theta_{k-1})) \\ \theta_{k-1} + T\omega_{k-1} \\ v_{k-1} \\ \omega_{k-1} \end{bmatrix}$$

$$x_k = f_{k|k-1}(x_{k-1}) + \mathcal{N}(0, Q)$$

| Variable | Description |
|---|---|
| y | Lateral position of the object |
| x | Longitudinal position of the object |
| θ | Rotation angle of the object |
| v | Relative speed of the object |
| ω | Rotation speed of the object |
| T | Unit time, sampling time |
| N (•) | Random variable of Gaussian distribution |
| Q | Covariance of model noise |

In addition, for example, when the convergence track is tracked, the surrounding vehicle state estimator may track the convergence track through convergence of the front radar track and the free space of the surrounding vehicle information using the particle filter.

When the convergence track is tracked, the surrounding vehicle state estimator may calculate a degree of importance with respect to the predicted convergence track using the front radar track and the free space, calculate the expected value and the covariance of the convergence track using the calculated degree of importance and the particles of the convergence track, and resample the calculated results, thereby tracking the convergence track.

At this time, when the calculated results are resampled, the surrounding vehicle state estimator 200 may remove particles having a lower degree of importance than a predetermined reference value from the calculated results, thereby performing resampling.

In addition, when the degree of importance is calculated with respect to the predicted convergence track using the front radar track and the free space, the surrounding vehicle state estimator 200 may detect the front radar track and free space associated with the predicted convergence track and calculate the degree of importance using the detected front radar track and free space.

Here, when the front radar track and free space associated with the predicted convergence track are detected, the surrounding vehicle state estimator 200 may check association between the predicted convergence track and the front radar track through gating of the front radar track, check association between the predicted convergence track and the free space through gating of the free space, and detect the front radar track and the free space associated with the predicted convergence track based on the checked association.

Figure 5:
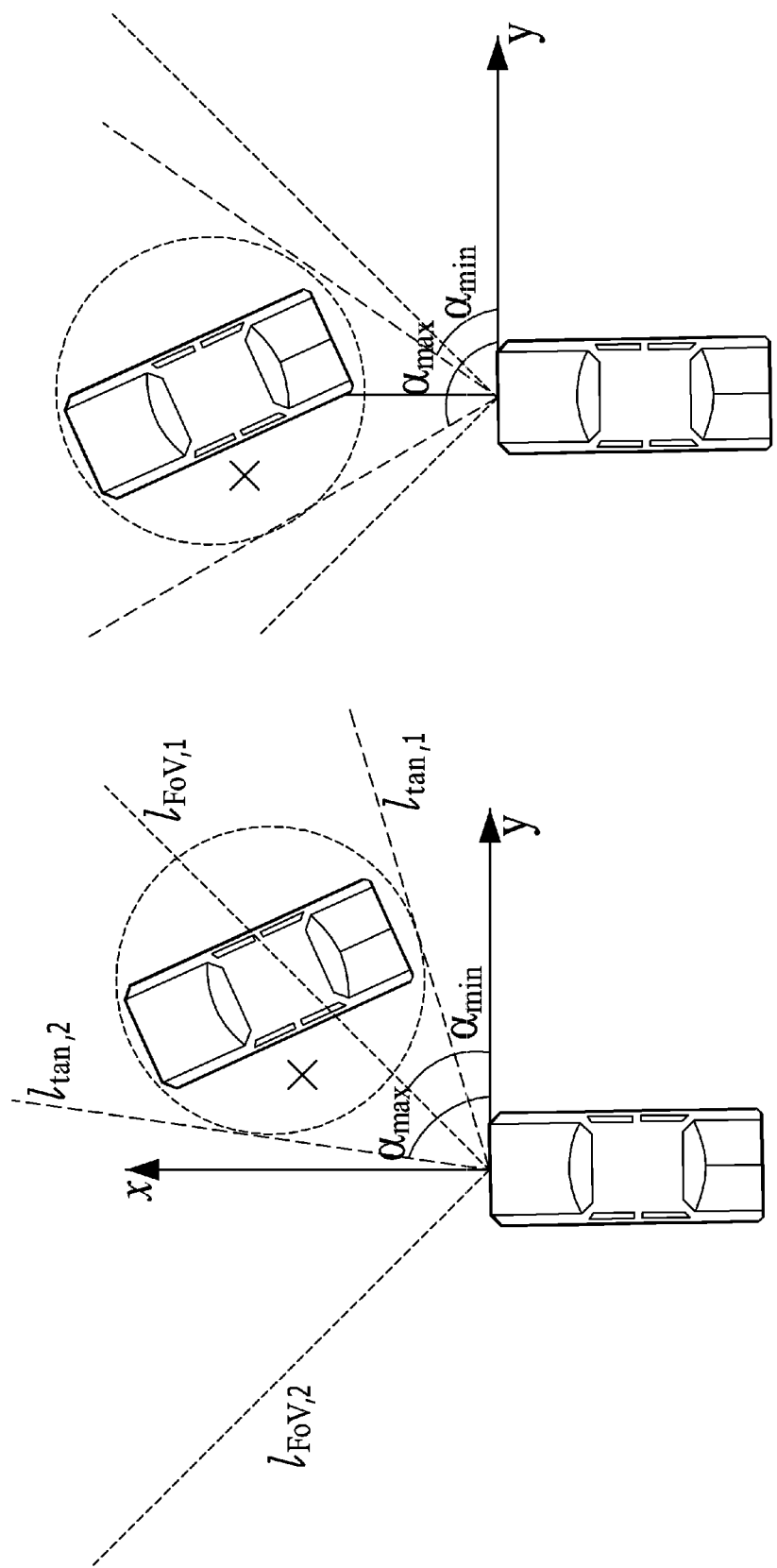

As shown in FIG. 5, the surrounding vehicle state estimator 200 may perform importance calculation, draw a virtual line to one point of the front radar track to calculate a distance to a point passing through the particles of the convergence track having a rectangular shape, and design the detection model of the front radar track in the form of a Gaussian mixture to reflect the characteristics of the radar.

Here, $P(\alpha_j, FRT, k/x_k)$ means a probability of detecting an azimuth angle $\alpha_j$, FRT, k of the front radar track when the state $x_k$ of the object is known and may be calculated by the following equation.

$$P(\alpha_{j,FRT,k} \mid x_k) P(r_{j,FRT,k} \mid \alpha_{j,FRT,k}, x_k) P(v_{d,j,FRT,k} \mid r_{j,FRT,k}, \alpha_{j,FRT,k}, x_k)$$

$$P(\alpha_{j,FRT,k} \mid x_k) = \begin{cases} 1/(\alpha_{max} - \alpha_{min}) & \text{if } \alpha_{min} \leq \alpha_{j,FRT,k} \leq \alpha_{max} \\ P_D P_C & \text{otherwise} \end{cases}$$

Figure 6A:
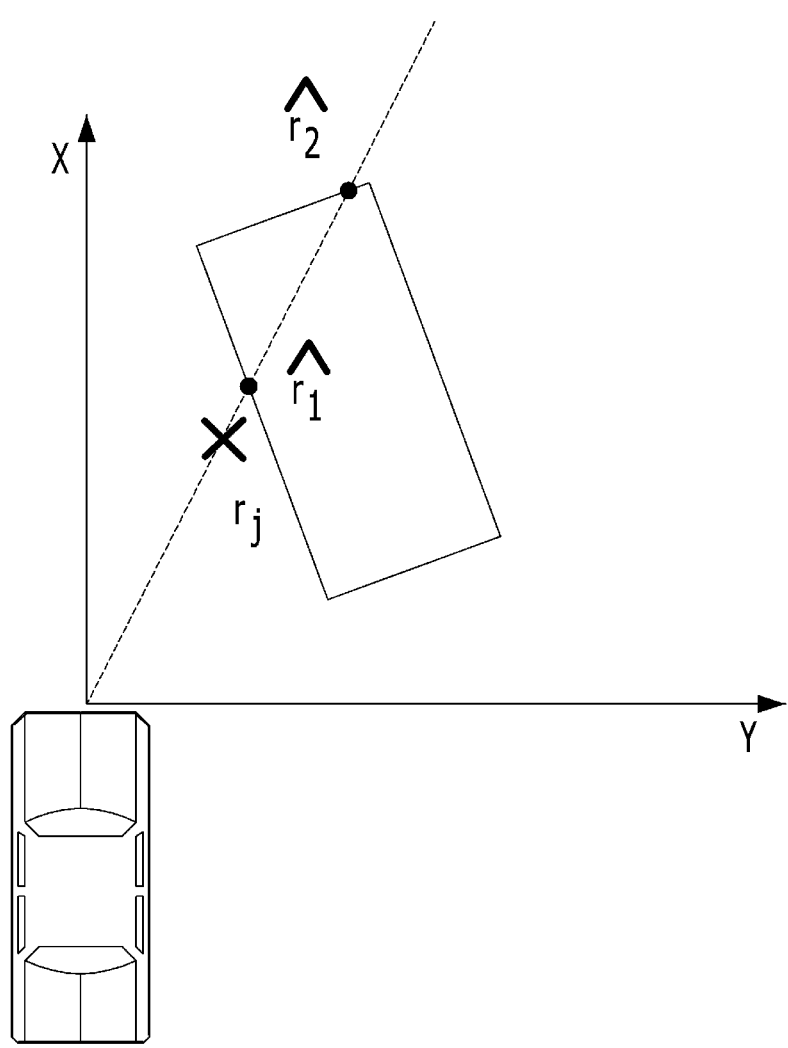
Figure 6B:
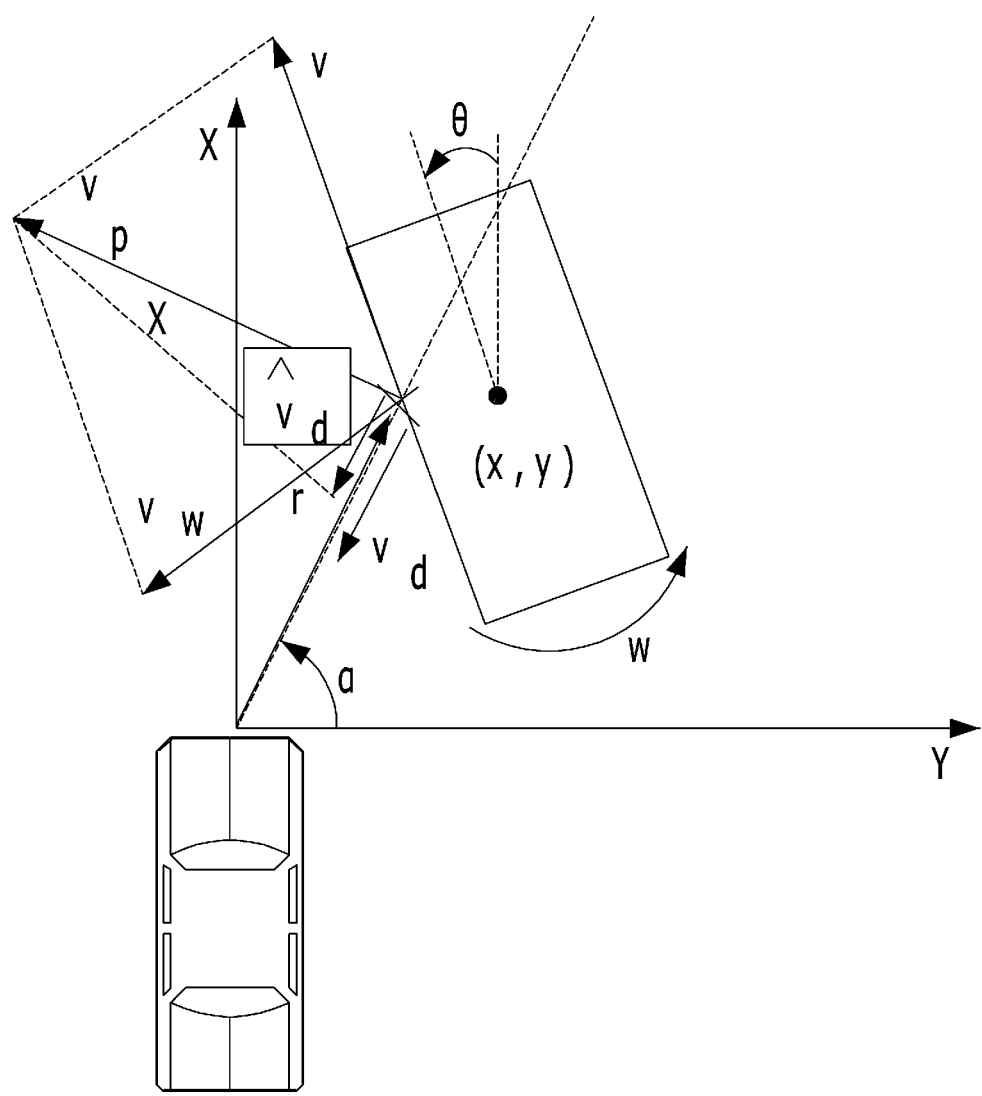

In addition, as shown in FIGS. 6A and 6B, the surrounding vehicle state estimator 200 may perform importance calculation, draw a virtual line to one point of the front radar track to calculate a distance to a point passing through the particles of the convergence track having a rectangular shape, calculate a predicted relative speed of the particles of the convergence track and $v_{d,j, FRT, k}$, $r_{j, FRT, k}$, and $\alpha_{j, FRT, k}$ of the front radar track, design the relative distance model of the front radar track in the form of a Gaussian mixture to reflect the characteristics of the radar, and design the relative speed model of the front radar track in the Gaussian form.

As shown in FIG. 6A, $P(r_{j, FRT, k}/\alpha_{j, FRT, k}, x_k)$ means a probability of a relative distance when the azimuth angle $\alpha_j$, FRT, k of the front radar track and the state xk of the object are known. As shown in FIG. 6B, $P(v_{d, j, FRT, k}/r_{j, FRT, k}, \alpha_{j, FRT, k}, x_k)$ means a probability of a relative speed $v_{d, j, FRT, k}$ when the azimuth angle $\alpha_{j, FRT, k}$ of the front radar track and the state $x_k$ of the object are known. These may be calculated by the following equations.

$$P(\alpha_{j,FRT,k} \mid x_k) P(r_{j,FRT,k} \mid \alpha_{j,FRT,k}, x_k) P(v_{d,j,FRT,k} \mid r_{j,FRT,k}, \alpha_{j,FRT,k}, x_k)$$

$$P(r_{j,FRT,k} \mid \alpha_{j,FRT,k}, x_k) = \sum_{i=1}^{2} \frac{c_i}{\sqrt{2\pi\sigma_r^2}} \exp\left(-\frac{(r_j - \hat{r}_i)^2}{2\sigma_r^2}\right)$$

$$P(r_{d,j,FRT,k} \mid r_{j,FRT,k}, \alpha_{j,FRT,k}, x_k) = \frac{1}{\sqrt{2\pi\sigma_{v_d}^2}} \exp\left(-\frac{(v_d - \bar{v}_d)^2}{2\sigma_{v_d}^2}\right)$$

Figure 7:
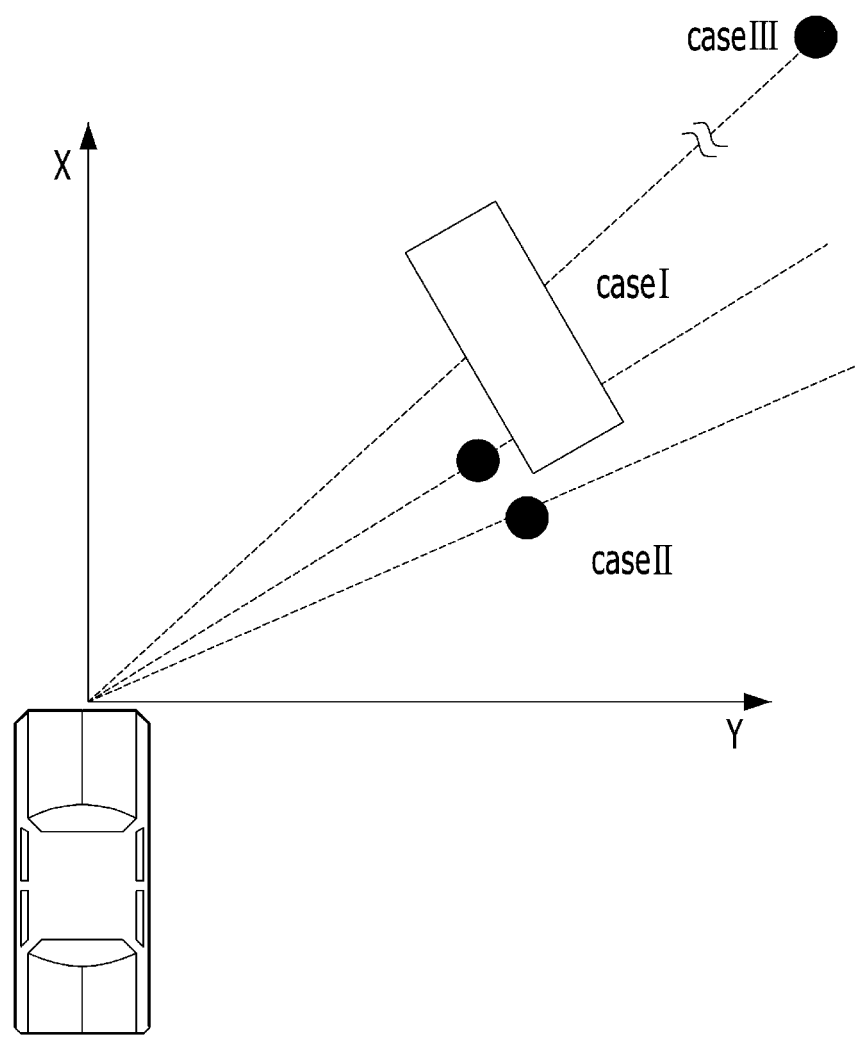

In addition, as shown in FIG. 7, the surrounding vehicle state estimator 200 may perform importance calculation, draw a virtual line to one point of the front radar track to calculate a distance to a point passing through the particles of the convergence track having a rectangular shape, design the detection model of the front radar track in the form of a Gaussian mixture to reflect the characteristics of the radar, and distinguish among normal detection, erroneous detection and non-detection using the characteristics of the free space where several points are measured at the same time to calculate a probability.

Here, P ($r_{j,\ FRT,\ k}/x_k$) means a probability of the relative distance $r_{j,\ FRT,\ k}$ of the free space when the state $x_k$ of the object is known and may be calculated by the following equation.

$$P(r_{j,F,S,k} | x_k) = \begin{cases} \sum_{i=1}^{2} \frac{c_i}{\sqrt{2\pi\sigma_r^2}} \exp\left(-\frac{(r_{j,FS,k} - \hat{r}_{x,i})^2}{2\sigma_r^2}\right) & \text{if case I} \\ P_D P_C & \text{if case II} \\ 1 - P_D & \text{if case III} \\ P_D & \text{Otherwise} \end{cases}$$

| Variable | Description |
| --- | --- |
| $c_i$ | Radar transmission coefficient ($c_1 = 0.95$, $c_2 = 0.05$) |
| $\sigma^2$ | Variance of (•) |
| $P_D$ | Probability of detecting the object (0.999) |
| $P_C$ | Probability of erroneously detecting the object (.001) |
| $r_{j,\ FS,\ k}$ | Relative distance to the free space |
| $v_{d,\ j,\ FRT,\ k}$ | Doppler speed of the front radar track |
| $r_{j,\ FRT,\ k}$ | Relative distance of the front radar track |
| $\alpha_{j,\ FRT,\ k}$ | Azimuth angle of the front radar track |

Figure 8A:
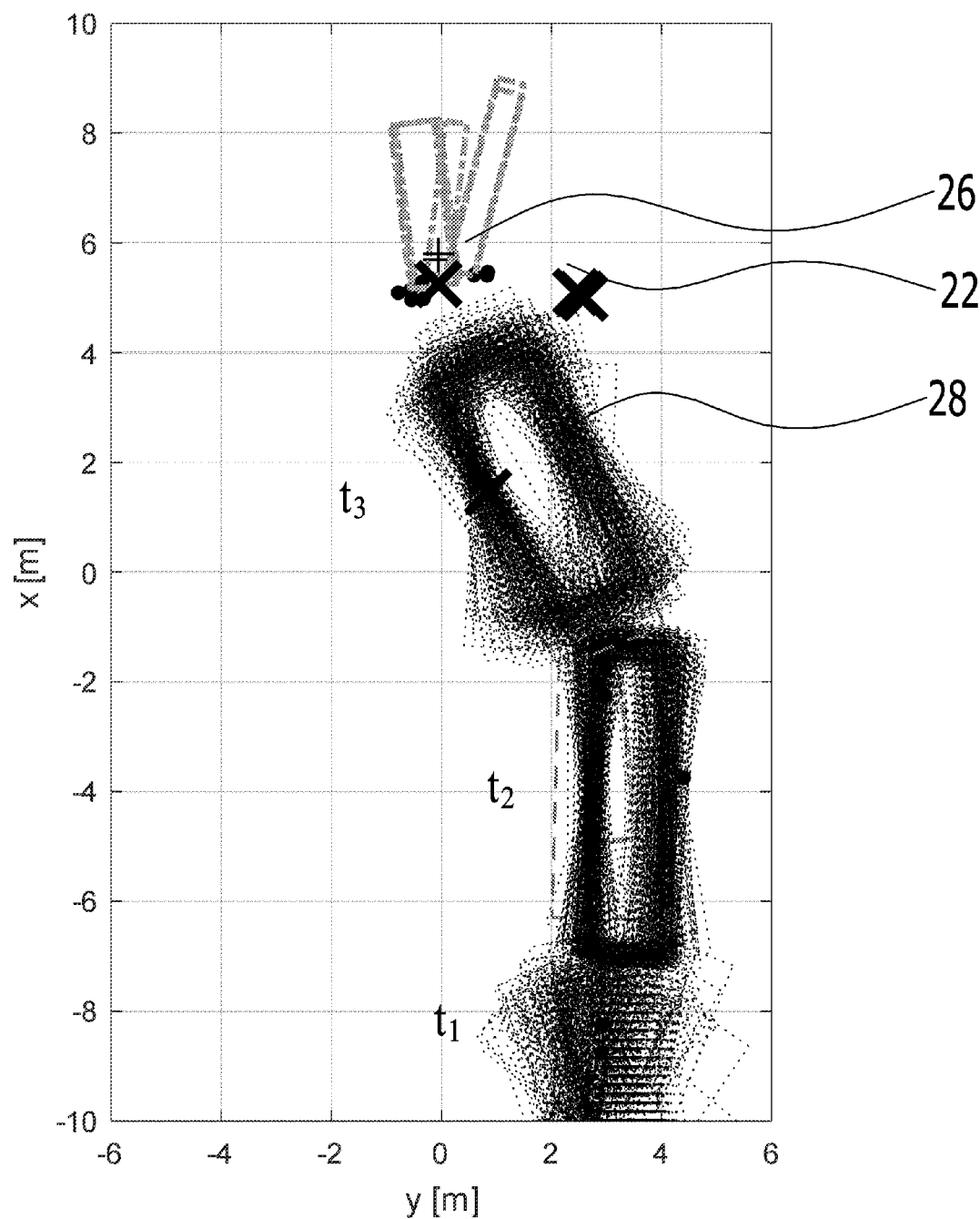
FIGS. 8A and 8B are views illustrating a process of tracking a convergence track in the surrounding vehicle state estimator of FIG. 1.
Figure 8B:
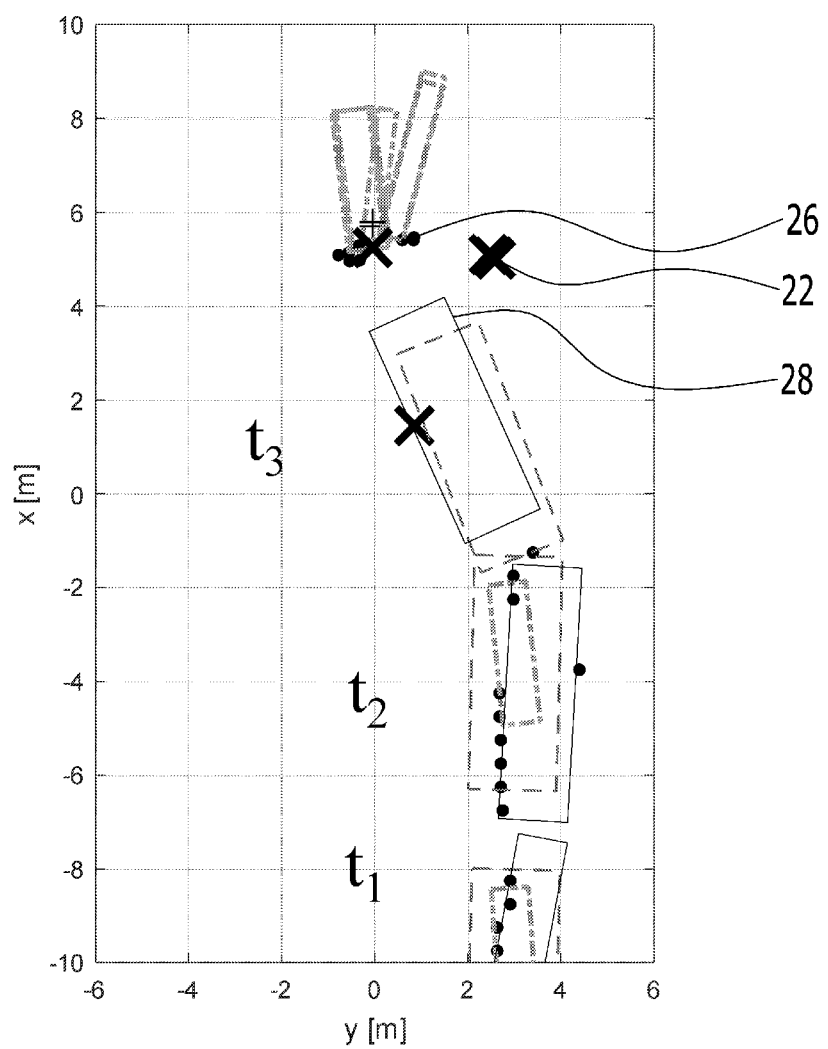

FIGS. 8A and 8B are views illustrating a process of tracking the convergence track in the surrounding vehicle state estimator of FIG. 1.

FIG. 8A shows the particle distribution of a convergence algorithm and FIG. 8B shows the track of the convergence algorithm.

As shown in FIGS. 8A and 8B, a time t1 is a time when the side radar track 28 is first detected and thus a convergence track is generated. At this time, particles are distributed in a wide range.

Subsequently, at a time t2, the free space 26 is stably detected such that particles are densely generated as shown in FIG. 8A and the convergence track is aligned with the free space 26 as shown in FIG. 8B.

Next, a time t3 is a time when the free space 26 is insufficient and the front radar track 22 is generated. At this time, the particles are widely distributed as compared to the time t2 in FIG. 8A, but the convergence track may be stably tracked as shown in FIG. 8B.

The concurrent lane change prediction method of the concurrent lane change prediction apparatus of the present invention may be performed as follows.

First, when subject vehicle information and estimated surrounding lane state information are received, the subject vehicle state estimator of embodiments of the present invention may estimate the state of the subject vehicle based on the received subject vehicle information and the estimated surrounding lane state information.

The estimated surrounding lane state information may include the position, angle and curvature of a surrounding lane.

In addition, when the state of the subject vehicle is estimated, the subject vehicle state estimator of embodiments of the present invention may request the surrounding lane state information from the lane state estimator upon receiving the subject vehicle information to receive the estimated surrounding lane state information from the lane state estimator.

In some cases, when the state of the subject vehicle is estimated, the subject vehicle state estimator of embodiments of the present invention may request the subject vehicle information from the internal sensor of the subject vehicle upon receiving a concurrent lane change prediction request to receive the subject vehicle information from the internal sensor of the subject vehicle, and, at the same time, request the surrounding lane state information from the lane state estimator to receive the estimated surrounding lane state information from the lane state estimator.

In other cases, when the state of the subject vehicle is estimated, the subject vehicle state estimator of embodiments of the present invention may request the subject vehicle information from the internal sensor of the subject vehicle upon receiving a concurrent lane change prediction request to receive the subject vehicle information from the internal sensor of the subject vehicle, and request the surrounding lane state information from the lane state estimator upon receiving the subject vehicle information from the internal sensor of the subject vehicle to receive the estimated surrounding lane state information from the lane state estimator.

In addition, when the state of the subject vehicle is estimated, the subject vehicle state estimator of embodiments of the present invention may estimate the state of the subject vehicle including the position and heading of the subject vehicle.

When the surrounding vehicle information is received, the surrounding vehicle state estimator of embodiments of the present invention may estimate the state of the surrounding vehicle through convergence of the received surrounding vehicle information.

When the state of the surrounding vehicle is estimated, the surrounding vehicle state estimator of embodiments of the present invention may receive the surrounding vehicle information from the front radar and the side radar of the subject vehicle.

At this time, the surrounding vehicle information may include a side radar track, a front radar track and a free space.

In addition, when the state of the surrounding vehicle is estimated, the surrounding vehicle state estimator of embodiments of the present invention may generate a convergence track based on the received surrounding vehicle information, predict the convergence track based the generated convergence track, and track the predicted convergence track, thereby estimating the state of the surrounding vehicle.

When the convergence track is generated, the surrounding vehicle state estimator of embodiments of the present invention may check whether a side radar track included in the received surrounding vehicle information is present in a predetermined region of interest (ROI) of convergence, check whether a convergence track associated with the side radar track is present when the side radar track is present in the ROI of convergence, and generate a new convergence track corresponding to the side radar track when the convergence track associated with the side radar track is not present in the ROI of convergence.

At this time, when checking whether the side radar track is present in the predetermined ROI of convergence, the surrounding vehicle state estimator of embodiments of the present invention may remove the convergence track corresponding to the side radar track if the side radar track is not present in the ROI of convergence.

In addition, when the convergence track corresponding to the side radar track is removed, the surrounding vehicle state estimator of the present invention may remove the convergence track corresponding to the side radar track if a measurement value of the convergence track corresponding to the side radar track is not present.

In addition, when the convergence track is predicted, the surrounding vehicle state estimator of embodiments of the present invention may predict the convergence track of a previous time as a convergence track of a current time using an equation of motion.

In addition, when the convergence track is tracked, the surrounding vehicle state estimator of embodiments of the present invention may track the convergence track through convergence of the front radar track and the free space of the surrounding vehicle information using a particle filter.

When the convergence track is tracked, the surrounding vehicle state estimator of embodiments of the present invention may calculate a degree of importance with respect to the predicted convergence track using the front radar track and the free space, calculate an expected value and a covariance of the convergence track using the calculated degree of importance and the particles of the convergence track, and resample the calculated result to track the convergence track.

At this time, when the calculated result is resampled, the surrounding vehicle state estimator of embodiments of the present invention may remove particles having a lower degree of importance than a predetermined reference value from the calculated result and resample the calculated result.

In addition, when the degree of importance is calculated with respect to the predicted convergence track using the front radar track and the free space, the surrounding vehicle state estimator of embodiments of the present invention may detect the front radar track and the free space associated with the predicted convergence track and calculate the degree of importance using the detected front radar track and the free space.

When the front radar track and the free space associated with the predicted convergence track are detected, the surrounding vehicle state estimator of embodiments of the present invention may check association between the predicted convergence track and the front radar track through gating of the front radar track, check association between the predicted convergence track and the free space through gating of the free space, and detect the front radar track and the free space associated with the predicted convergence track based on the checked association.

In addition, when the state of the surrounding vehicle is estimated, the surrounding vehicle state estimator of embodiments of the present invention may estimate the state of the surrounding vehicle based on the position and heading angle of the subject vehicle included in the estimated subject vehicle state information.

In addition, when the surrounding lane information is received, the lane state estimator of embodiments of the present invention may estimate the state of the surrounding lane based on the surrounding lane information and the estimated subject vehicle state information.

Here, when the state of the surrounding lane is estimated, the lane state estimator of embodiments of the present invention may receive the surrounding lane information from a front camera sensor of the subject vehicle.

In addition, when the state of the surrounding lane is estimated, the lane state estimator of embodiments of the present invention may estimate the state of the surrounding lane based on the position and heading angle of the subject vehicle included in the estimated subject vehicle state information.

Next, the lane change predictor of embodiments of the present invention may predict or determine concurrent lane change of the subject vehicle and the surrounding vehicle based on the estimated subject vehicle state information, the estimated surrounding vehicle state information and the estimated lane state information.

When the concurrent lane change of the subject vehicle and the surrounding vehicle is predicted, the lane change predictor of embodiments of the present invention may recognize a situation in which the rear wheel of a target vehicle and the front wheel of the subject vehicle are located on the same line based on the estimated subject vehicle state, the estimated surrounding vehicle state and the estimated lane state, and predict the concurrent lane change of the subject vehicle and the target vehicle according to the recognized situation.

When the concurrent lane change of the subject vehicle and the surrounding vehicle is predicted, the lane change predictor of embodiments of the present invention may recognize a situation wherein the front wheel of a target vehicle and the front wheel of the subject vehicle are located on the same line based on the estimated subject vehicle state, the estimated surrounding vehicle state and the estimated lane state, and predict the concurrent lane change of the subject vehicle and the target vehicle according to the recognized situation.

When the concurrent lane change of the subject vehicle and the surrounding vehicle is predicted, the lane change predictor of embodiments of the present invention may recognize a situation wherein the front wheel of a target vehicle and the rear wheel of the subject vehicle are located on the same line based on the estimated subject vehicle state, the estimated surrounding vehicle state and the estimated lane state, and predict the concurrent lane change of the subject vehicle and the target vehicle according to the recognized situation.

In embodiments, when determined that there are or will be concurrent lane change, a controller may control the subject vehicle not to make a lane change and to maintain the current lane without making a lane change, and the controller causes one or more devices to warn the driver, for example, using sound or other signals.

Additionally, in embodiments of the present invention, a computer-readable recording medium having recorded thereon a program for executing the method of predicting the concurrent lane change of multiple vehicles in the concurrent lane change prediction apparatus may perform a process provided by the method of predicting the concurrent lane change of the vehicles according to the embodiment of the present invention.

A vehicle according to one embodiment of the present invention includes a sensing device configured to sense a subject vehicle, a surrounding vehicle and a surrounding lane, and a concurrent lane change prediction apparatus configured to predict a concurrent lane change of a subject vehicle and a surrounding vehicle based on subject vehicle information, surrounding vehicle information and surrounding lane information received from the sensing device, wherein the concurrent lane change prediction apparatus includes a subject vehicle state estimator configured to estimate a state of the subject vehicle based on the subject vehicle information and surrounding lane state information, a surrounding vehicle state estimator configured to estimate a state of the surrounding vehicle based on the estimated subject vehicle state information from the subject vehicle state estimator and the surrounding vehicle information, a lane state estimator configured to estimate a state of a surrounding lane based on the estimated subject vehicle state information from the subject vehicle state estimator and the surrounding lane information, and a lane change predictor configured to predict concurrent lane change of the subject vehicle and the surrounding vehicle based on the estimated subject vehicle state information from the subject vehicle state estimator, the estimated surrounding vehicle state information from the surrounding vehicle state estimator and the estimated lane state information from the lane state estimator.

In embodiments of the present invention, it is possible to prevent or minimize collision in advance and to improve safety, by improving accuracy of the heading angle of the concurrent lane change of multiple vehicles and accurately estimating various situations of the concurrent lane change of the vehicles.

In addition, in embodiments of the present invention, the vehicle can safely move in correspondence with the concurrent lane change situation, by improving accuracy of the heading angle of the vehicle.

In addition, in embodiments of the present invention, the vehicle can safely move in correspondence with the concurrent lane change situation, by accurately estimating the longitudinal/lateral error, heading angle error and shape of the vehicle.

In addition, in embodiments of the present invention, it is possible to improve estimation performance of the position and heading angle of the surrounding vehicle using the sensor model of the front radar and the side radar.

In embodiments of the present invention, if the design of the sensor model is modified or added using the type of the particle filter, it is possible to freely replace or add the sensor.

The embodiments of the present invention can enable fast situation recognition through accurate heading angle estimation of another vehicle in the concurrent lane change situation.

Embodiments of the present invention can enable precise collision avoidance by estimating the state of the subject vehicle and the state of the surrounding environment (lane) in the concurrent lane change situation.

Embodiments of the invention can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An apparatus for predicting a concurrent lane change of a subject vehicle and a surrounding vehicle, the apparatus comprising:
    a subject vehicle state estimator configured to estimate a state of the subject vehicle based on subject vehicle information and surrounding lane state information;
    a surrounding vehicle state estimator configured to estimate a state of the surrounding vehicle based on the subject vehicle state information from the subject vehicle state estimator and surrounding vehicle information;
    a lane state estimator configured to estimate a state of a surrounding lane based on the estimated subject vehicle state information from the subject vehicle state estimator and surrounding lane information;
    a lane change predictor configured to predict, as a heading angle of the subject vehicle changes, a concurrent lane change of the subject vehicle and the surrounding vehicle based on the estimated subject vehicle state information from the subject vehicle state estimator, the estimated surrounding vehicle state information from the surrounding vehicle state estimator, and the estimated surrounding lane state information from the lane state estimator; and
    a subject vehicle controller configured to adjust the heading angle of the subject vehicle during the predicted concurrent lane change of the subject vehicle and the surrounding vehicle,
    wherein predicting the concurrent lane change of the subject vehicle and the surrounding vehicle is performed according to recognizing, based on the estimated subject vehicle state information, the estimated surrounding vehicle state information, and the estimated surrounding lane state information, a situation in which a front wheel of the subject vehicle and a front wheel or a rear wheel of the surrounding vehicle are located on a first same road line or a situation in which a rear wheel of the subject vehicle and the front wheel of the surrounding vehicle are located on a second same road line.

2. The apparatus according to claim 1, wherein the subject vehicle state estimator is configured to receive the subject vehicle information from an internal sensor of the subject vehicle.

3. The apparatus according to claim 1, wherein the subject vehicle state estimator is configured to receive the estimated surrounding lane state information from the lane state estimator.

4. The apparatus according to claim 1, wherein, when the state of the subject vehicle is estimated, the subject vehicle state estimator is configured to estimate the state of the subject vehicle including a position and the heading angle of the subject vehicle.

5. The apparatus according to claim 1, wherein, when the state of the subject vehicle is estimated, the subject vehicle state estimator is configured to transmit the estimated subject vehicle state information to the surrounding vehicle state estimator, the lane state estimator, and the lane change predictor.

6. The apparatus according to claim 1, wherein the surrounding vehicle state estimator is configured to receive the surrounding vehicle information from a front radar and a side radar of the subject vehicle.

7. The apparatus according to claim 1, wherein, when the state of the surrounding vehicle is estimated, the surrounding vehicle state estimator is configured to generate a convergence track based on the received surrounding vehicle information, predict the convergence track based on the generated convergence track, track the predicted convergence track, and estimate the state of the surrounding vehicle.

8. The apparatus according to claim 1, wherein, when the state of the surrounding vehicle is estimated, the surrounding vehicle state estimator is configured to estimate the state of the surrounding vehicle based on a position and the heading angle of the subject vehicle included in the estimated subject vehicle state information.

9. The apparatus according to claim 1, wherein, when the state of the surrounding vehicle is estimated, the surrounding vehicle state estimator is configured to transmit the estimated surrounding vehicle state information to the lane change predictor.

10. The apparatus according to claim 1, wherein the lane state estimator is configured to receive the surrounding lane information from a front camera sensor of the subject vehicle.

11. The apparatus according to claim 1, wherein, when the state of the surrounding vehicle is estimated, the lane state estimator is configured to estimate the state of the surrounding lane based on a position and the heading angle of the subject vehicle included in the estimated subject vehicle state information.

12. A method of predicting a concurrent lane change of a subject vehicle and a surrounding vehicle in a concurrent lane change prediction apparatus including a subject vehicle estimator, a surrounding vehicle state estimator, a lane state estimator, and a lane change predictor, the method comprising:
estimating, by the subject vehicle state estimator, a state of the subject vehicle based on subject vehicle information and surrounding lane state information;
estimating, by the surrounding vehicle state estimator, a state of the surrounding vehicle based on the estimated subject vehicle state information and surrounding vehicle information;
estimating, by the lane state estimator, a state of a surrounding lane based on the estimated subject vehicle state information and surrounding lane information;
as a heading angle of the subject vehicle changes, predicting, by the lane change predictor, the concurrent lane change of the subject vehicle and the surrounding vehicle based on the estimated subject vehicle state information, the estimated surrounding vehicle state information, and the estimated surrounding lane state information; and
adjusting, by a subject vehicle controller, the heading angle of the subject vehicle during the predicted concurrent lane change of the subject vehicle, and the surrounding vehicle,
wherein the predicting of the concurrent lane change of the subject vehicle and the surrounding vehicle is performed according to recognizing, based on the estimated subject vehicle state information, the estimated surrounding vehicle state information, and the estimated surrounding lane state information, a situation in which a front wheel of the subject vehicle and a front wheel or a rear wheel of the surrounding vehicle are located on a first same road line or a situation in which a rear wheel of the subject vehicle and the front wheel of the surrounding vehicle are located on a second same road line.

13. The method according to claim 12, wherein the estimating of the state of the subject vehicle includes receiving the subject vehicle information from at least one internal sensor of the subject vehicle and receiving the estimated surrounding lane state information from the lane state estimator.

14. The method according to claim 13, wherein the estimating of the state of the subject vehicle includes estimating the state of the subject vehicle including a position and the heading angle of the subject vehicle.

15. The method according to claim 13, wherein the estimating of the state of the surrounding vehicle includes receiving the surrounding vehicle information from a front radar and a side radar of the subject vehicle.

16. The method according to claim 13, wherein the estimating of the state of the surrounding vehicle includes generating a convergence track based on the received surrounding vehicle information, predicting the convergence track based on the generated convergence track, tracking the predicted convergence track, and estimating the state of the surrounding vehicle.

17. The method according to claim 13, wherein the estimating of the state of the surrounding vehicle includes estimating the state of the surrounding vehicle based on a position and the heading angle of the subject vehicle included in the estimated subject vehicle state information.

18. The method according to claim 13, wherein the estimating of the state of the surrounding vehicle includes receiving the surrounding lane information from a front camera sensor of the subject vehicle.

19. The method according to claim 13, wherein the estimating of the state of the surrounding vehicle includes estimating the state of the surrounding lane based on a position and the heading angle of the subject vehicle included in the estimated subject vehicle state information.

20. A subject vehicle comprising:
a plurality of sensors configured to acquire driving information of the subject vehicle, driving information of a surrounding vehicle, and information of a surrounding lane; and
an apparatus in communication with the plurality of sensors;
wherein the apparatus is configured to, as a heading angle of the subject vehicle changes, predict a concurrent lane change of the subject vehicle and the surrounding vehicle based on the driving information of the subject vehicle, the surrounding vehicle driving information, and the surrounding lane information each received from the plurality of sensors and adjust the heading angle of the subject vehicle during the predicted concurrent lane change of the subject vehicle and the surrounding vehicle,
wherein predicting the concurrent lane change of the subject vehicle and the surrounding vehicle is performed according to recognizing, based on the estimated subject vehicle state information, the estimated surrounding vehicle state information, and the estimated surrounding lane state information, a situation in which a front wheel of the subject vehicle and a front wheel or a rear wheel of the surrounding vehicle are located on a first same road line or a situation in which a rear wheel of the subject vehicle and the front wheel of the surrounding vehicle are located on a second same road line.

* * * * *